United States Patent [19]

Petersen

[11] 3,818,528
[45] June 25, 1974

[54] PORTABLE RAMP FOR WHEEL CHAIRS AND THE LIKE

[76] Inventor: Philip L. Petersen, 411 Fern Dell Pl., Glendora, Calif. 91740

[22] Filed: Oct. 4, 1972

[21] Appl. No.: 294,773

[52] U.S. Cl. ................................................ 14/72
[51] Int. Cl. ............................................ E01d 15/12
[58] Field of Search ............................. 14/72, 71, 1

[56] References Cited
UNITED STATES PATENTS

| | | | |
|---|---|---|---|
| 596,867 | 1/1898 | Frick | 14/72 |
| 963,918 | 7/1910 | Miller | 14/72 |
| 2,635,889 | 4/1953 | Conlello | 14/72 X |
| 3,009,183 | 11/1961 | Lay | 14/72 |
| 3,030,645 | 4/1962 | Shaw | 14/72 |
| 3,176,334 | 4/1965 | Lovdahl | 14/71 |
| 3,239,862 | 3/1966 | Hire | 14/1 |
| 3,416,269 | 12/1968 | Stone | 14/71 X |
| 3,651,528 | 3/1972 | Behrmann | 14/1 |

Primary Examiner—Nile C. Byers, Jr.
Attorney, Agent, or Firm—Boniard I. Brown

[57] ABSTRACT

A portable ramp embodying a number of longitudinal ramp members disposed side by side, each including a number of separate ramp sections arranged end to end, and hinges joining the adjacent ramp members and the adjacent ramp sections of each member in a manner such that the ramp may be folded laterally and endwise between an expanded configuration of use and a collapsed configuration in which the ramp may be conveniently stored and transported. The ramp is intended primarily for use as a wheel chair ramp for steps and the like, although the ramp may be used for other purposes.

10 Claims, 13 Drawing Figures

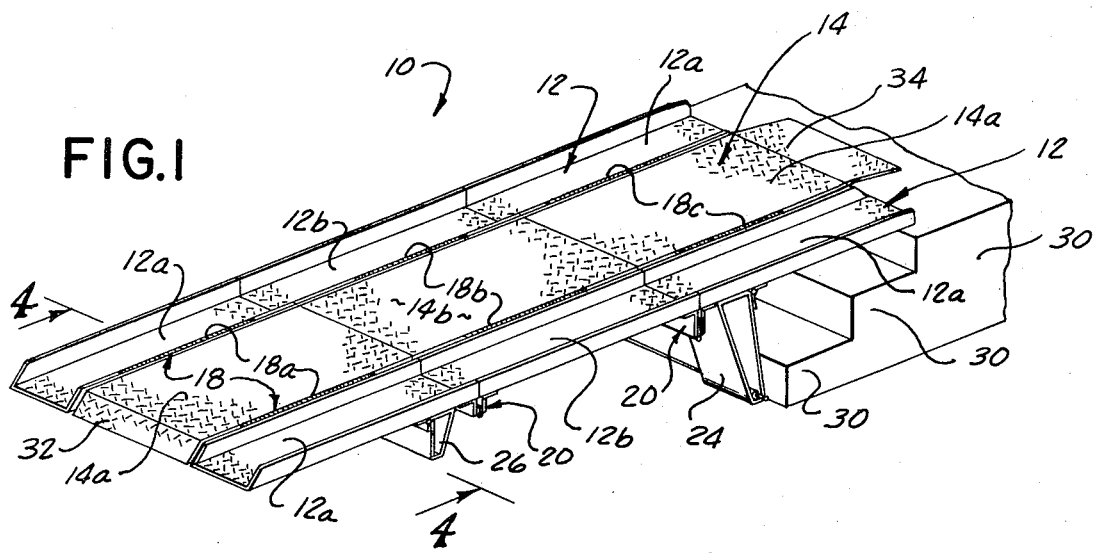
FIG. 1
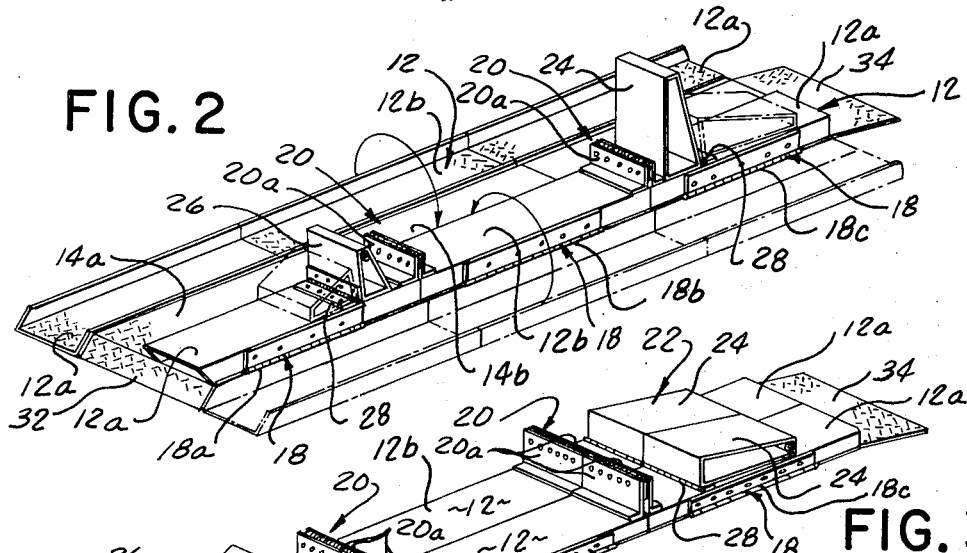
FIG. 2
FIG. 3
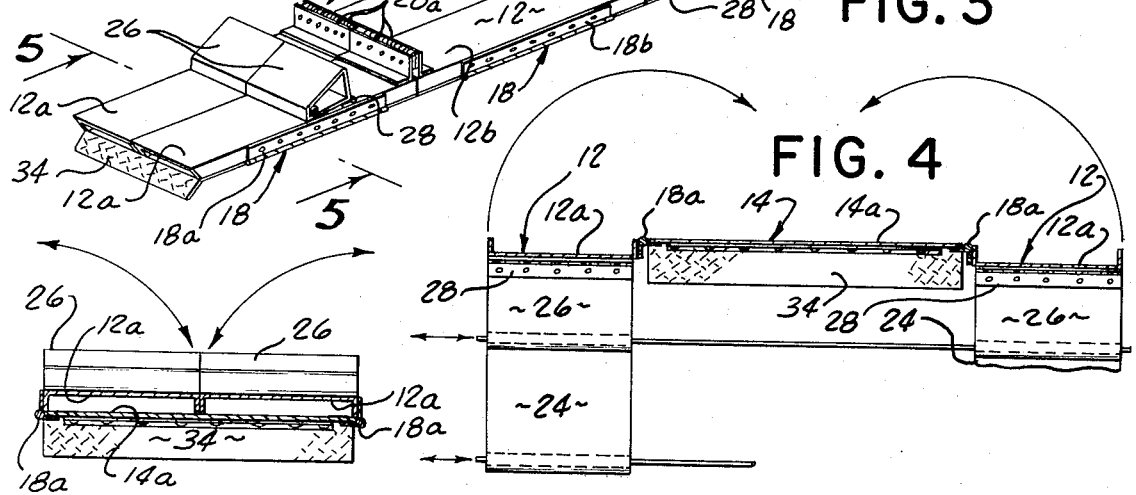
FIG. 4
FIG. 5

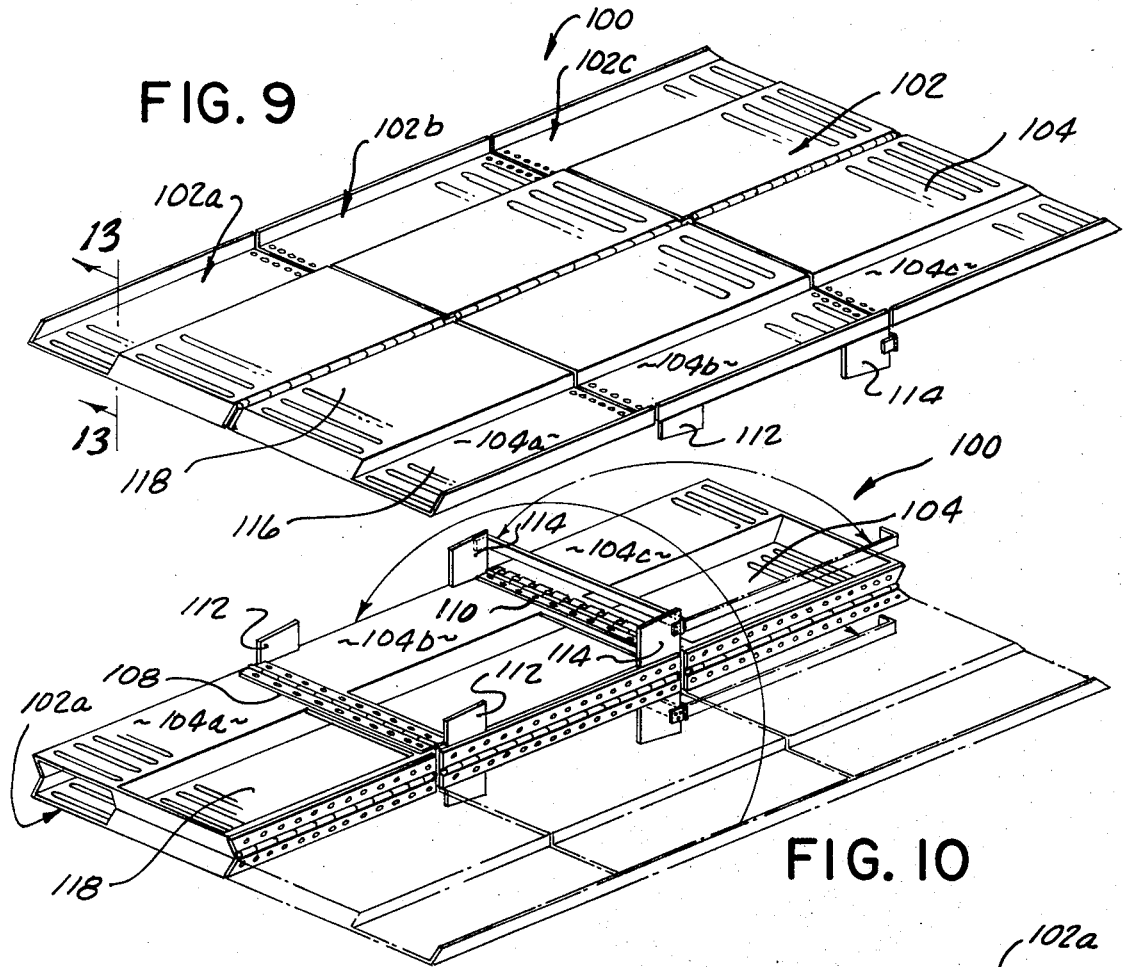
FIG. 9
FIG. 10
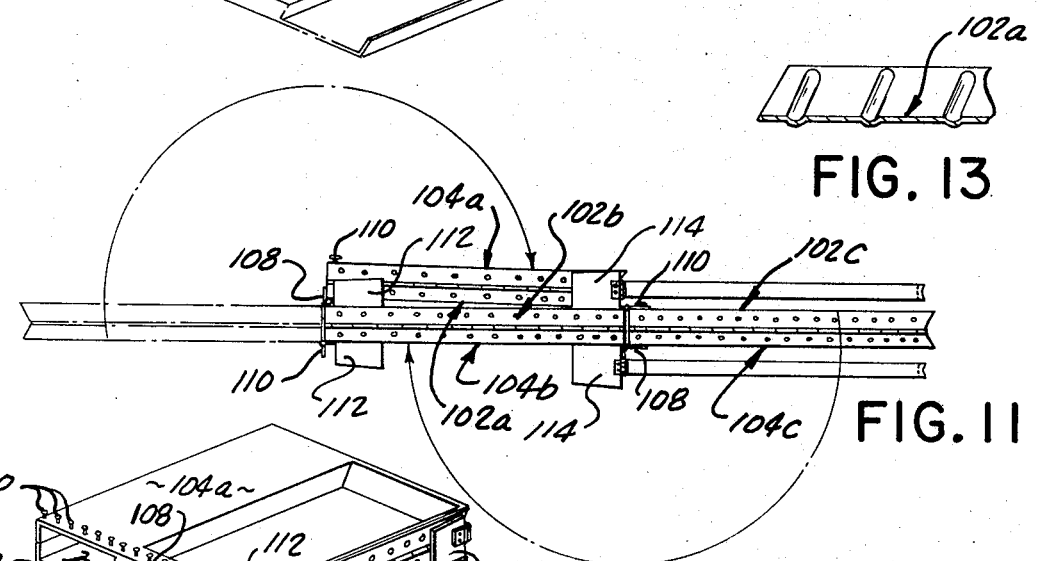
FIG. 13
FIG. 11
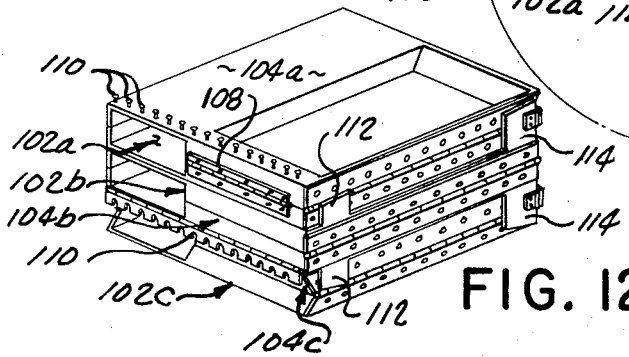
FIG. 12

3,818,528

PORTABLE RAMP FOR WHEEL CHAIRS AND THE LIKE

BACKGROUND OF THE INVENTION

1. Field of the Invention

This invention relates generally to ramps and more particularly to a portable ramp which may be folded to a compact configuration for convenience of storage and transportation.

2. Prior Art

As will appear from the ensuing description, the portable ramp of the invention may be used for various purposes. However, the ramp is intended primarily for use as a wheel chair ramp and will be described in this connection.

Wheel chair ramps are known in the art. A ramp of this type, for example, is found in U.S. Pat. No. 3,030,645. Such ramps are designed to permit a wheel chair to negotiate steps and other similar obstructions by providing an inclined ramp surface leading from the bottom to the top of the obstruction.

One of the difficulties involved in the use of such ramps resides in the fact that it is frequently necessary to store the ramp or transport the latter from one location of use to another. Unless the ramp can be conveniently collapsed, this storage and transportation of the ramp poses a problem.

SUMMARY OF THE INVENTION

The present invention provides an improved portable ramp which may be folded from its normal configuration of use to a compact configuration for convenience of storage and transportion from one location to another. The ramp has a number of separate longitudinal ramp members disposed side by side, each including a number of separate ramp sections arranged end to end. The adjacent ramp members are joined by longitudinal hinge means which permit the ramp to be folded laterally. The adjacent ramp sections of at least some ramp members are joined by lateral hinge means which permit endwise folding of the ramp.

In its normal configuration of use, the several ramp members and sections are disposed side by side and end to end substantially in a common plane so as to provide the ramp with a generally planar configuration. Supports, such as legs, may be attached to the underside of the ramp to support the latter in an inclined attitude of use. In the particular embodiment of the invention illustrated, certain of the ramp members have longitudinal channels which provide tracks for receiving the wheels of a wheel chair to guide the latter as it moves up and down along the ramp.

The ramp is collapsed for storage of transportation by folding the ramp laterally about its longitudinal hinge axes and lengthwise about its lateral hinge axes. In its collapsed or folded configuration, the several ramp members and ramp sections are disposed in face to face relation in such a way that the ramp presents a relatively small generally rectangular package of minimum overall dimensions which may be conveniently stored or moved from one location to another.

BRIEF DESCRIPTION OF THE DRAWINGS

FIG. 1 is a perspective view of an inclined wheel chair ramp according to the invention, illustrating the ramp installed in a position of use;

FIG. 2 illustrates an initial folding step involved in collapsing the ramp;

FIG. 3 illustrates the ramp in its partially folded configuration;

FIG. 4 is an enlarged section taken on line 4—4 in FIG. 1;

FIG. 5 is an enlarged section taken on line 5—5 in FIG. 3;

FIG. 9 is a fragmentary perspective view of a modified wheel chair ramp according to the invention;

FIG. 10 illustrates an initial step in folding the ramp to its collapsed configuration;

FIG. 11 is a side elevation of the ramp illustrating the successive folding steps involved in collapsing the ramp;

FIG. 12 is a perspective view illustrating the ramp in its fully collapsed configuration; and FIG. 13 is a fragmentary enlarged detail illustrating the manner in which the ramp surfaces are grooved to increase traction.

DESCRIPTION OF THE PREFERRED EMBODIMENTS

Figure 6:
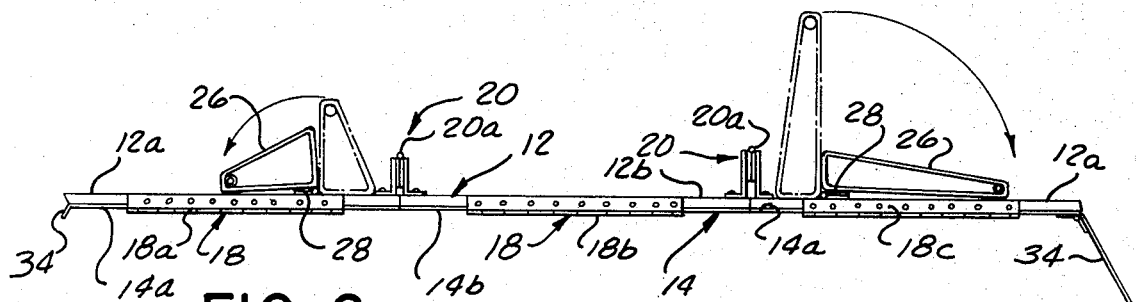
FIG. 6 is a side elevation of the ramp illustrating certain folding legs embodied in the ramp.

Turning first to FIGS. 1 through 8 of the drawings, there is illustrated a ramp 10 according to the invention. This ramp comprises two laterally outer longitudinal ramp members 12 and a center longitudinal ramp member 14 disposed side by side. Each ramp member is composed of three separate ramp sections which are designated by the numeral of the respective ramp member and the subscript A for the two longitudinally outer sections and the subscript B for the center section. The adjacent ramp sections of the two outer ramp members 12 are pivotally joined along their ends by lateral hinge means 20.

As will appear from the ensuing description, the lateral hinge means 20 are arranged to prevent folding of the ramp about its lateral hinge axis when the ramp is loaded in its normal configuration of use illustrated in FIG. 1. As will appear from the ensuing description, the arrangement of the lateral hinge means is such that at lease in some applications, further support or reinforcement of the ramp to prevent the latter from buckling under load may be unnecessary. However, the ramp is preferably equipped with additional supports 22 for this purpose. In this case, the ramp supports comprise supporting legs 24 and 26 at the undersides of the outer ramp sections 12a. These legs are secured to their respective ramp sections by lateral hinge means 28, such that the legs may be folded in the manner illustrated best in FIG. 6 and explained below.

In its normal configuration of use shown in FIG. 1, the several ramp members 12, 14 and their respective ramp sections are disposed generally in a common plane. Accordingly, the ramp, as a whole, has a generally planar configuration. The ramp legs 24, 26 are unfolded to depend generally vertically down from the underside of the ramp to support the latter in an inclined attitude of use, illustrated in FIG. 1. The length of these legs may vary, depending upon the length of the ramp, the location of the legs along the ramp, and the desired elevation of the upper end of the ramp in its normal position of use. The illustrated ramp, for example, is designed to rest at its upper end on the top step 30 of a series of steps, as shown in FIG. 1. In this case, the legs 24, 26 are longitudinally dimensioned to rest on the ground at the base of the steps 30 when the lower end of the ramp rests on the ground and the other ramp end rests on the top step. Hinged sub-ramps 32 and 34 are pivotally attached to the ends of the center ramp member 14 to rest at their outer ends on the ground and the top step, as shown, when the ramp is installed in its position of use. These small sub-ramps provide inclined surfaces leading to each end of the center ramp member 14 so as to permit a person pushing a wheel chair up or down the ramp from tripping over the ramp ends.

As noted earlier and as will be evident from the description thus far, a ramp according to the invention may be used for a variety of purposes. In some of the uses, the ramp legs may be useless or unnecessary, in which case they may be eliminated. The particular ramp illustrated is intended for use as a wheel chair ramp to permit a wheel chair to negotiate the steps 30. The wheel chair may be either propelled along the ramp by the occupant of the wheel chair or pushed along the ramp by an assistant behind the chair.

Referring in greater detail to the drawings, the outer ramp members 12 provide tracks for receiving the wheels of a wheel chair. To this end, the outer ramp sections 12a, 12b comprise upwardly opening channels aligned end to end. The sections 14a, 14b of the center ramp member 14 comprise rectangular plates disposed edge to edge. The center ramp member serves a twofold purpose. First, it provides a mechanical connection between the two outer ramp members or channels 12 and, in this function, forms part of the longitudinal hinge means 18. Secondly, the center ramp member provides a walk-way for a person pushing a wheel chair along the ramp. To this latter end, the normally upper surfaces of the center ramp sections or plates 14a, 14b are embossed, grooved, or otherwise roughened to improved the traction, with these ramp surfaces, of the wheel chair wheels and the shoes of the person pushing the chair.

The several ramp sections 12a, 12b, 14a, 14b have substantially equal length. Each ramp section, therefore, has a length which is approximately one-third the length of the ramp. The two outer ramp members 12 have substantially equal width, while the center ramp member 14 has a width approximately twice that of the outer ramp members.

The longitudinal hinge means 18 comprise separate hinge sections 18a. Each longitudinal hinge section joins one outer ramp section or channel to its adjacent center ramp section or plate. In this regard, it is significant to note that in the normal use configuration of the ramp illustrated in FIG. 1, the three hinge sections along each side of the center ramp member 14 have a common hinge axis which is substantially flush with the upper surfaces of the center ramp plates 14a, 14b and the upper edges of the inner flanges on the outer ramp channels 12a, 12b.

The lateral hinge means 20 comprise separate hinge sections 20a. Each lateral hinge section joins one outer ramp channel 12a to the adjacent center ramp channel 12b. The two outer ramp plates 14a are not directly joined to the center ramp plate 14b but are rather indirectly joined to the latter plate through the adjacent longitudinal and lateral hinge sections 18a, 20a. It is significant to note relative to the lateral hinge means that the two lateral hinge sections 20a at each end of the ramp have a common axis. This hinge axis is located a distance below the underside of the ramp, along the intersection of a plane parallel to the ramp with a plane normal to the ramp and passing between the ends of the adjacent outer and center ramp channels and plates.

To accomplish this location of the lateral hinge axes, each lateral hinge section 18a comprises a pair of L-shaped hinge members 36. These hinge members have one flange welded or otherwise rigidly joined to the undersides of the respective ramp channels 12a, 12b and their other flanges projecting normal to the channels. It will be observed that with this lateral hinge arrangement, the ends of the adjacent ramp channels 12a, 12b and adjacent ramp plates 14a, 14b abut one another when the ramp occupies its unfolded configuration of use shown in FIG. 1. This abutment of the ramp channels and ramp plates aids the legs 24, 26 in supporting or reinforcing the ramp against deflection under load in its normal configuration of the use illustrated in FIG. 1.

The supporting legs 24, 26 of the ramp are tapered longitudinally and are hinged to the undersides of their respective ramp channels 12a along one of their wide base edges. Each leg is rotatable between its extended position of FIGS. 1 and 2 and its retracted or folded position of FIG. 3. These extended and folded positions of the legs are also illustrated in FIG. 6.

As noted earlier, FIG. 1 illustrates the ramp 10 in its normal configuration of use. In this configuration, the upper end of the ramp is located in close proximity to or rests on the upper step 30. The lower end of the ramp is located in close proximity to or rests on the ground in front of the steps. The ramp legs 24, 26 are unfolded downwardly and are supported on the ground in front of the steps. In this configuration, the ramp enables a wheel chair to negotiate the obstruction presented by the steps 30, either by being pushed along the ramp or by propulsion of the chair along the ramp by its occupant. As noted earlier, the two outer ramp members 12 provide tracks for the wheels of the wheel chair, and the center ramp member 14 provides a walk-way for a person pushing the chair.

The wheel chair is transformed to its collapsed or folded configuration by first folding the ramp sections of the outer ramp members 12 laterally inward over the laterally adjacent ramp sections of the center ramp member 14, as illustrated in FIGS. 2 and 3. The ramp legs 24, 26 are then folded downwardly against the now upper surfaces of their respective ramp members 12. The ramp is now in a partially folded configuration wherein said pair of longitudinally adjacent ramp sections are disposed in confronting face to face relation with a pair of longitudinally adjacent ramp sections of the laterally adjacent ramp member to form a set of confronting ramp sections. Only one pair of longitudinally adjacent ramp sections of each of these ramp sets is joined by lateral hinge means to permit endwise folding of the ramp to its fully folded configuration, as described below.

Figure 7:
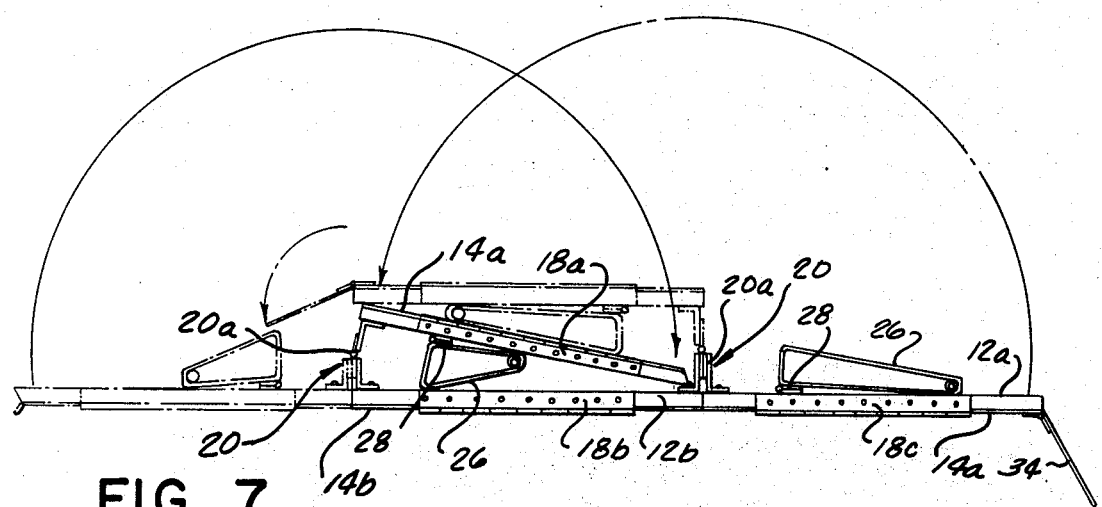
FIG. 7 is a side elevation of the ramp illustrating the various steps involved in folding the ramp to its collapsed configuration.
Figure 8:
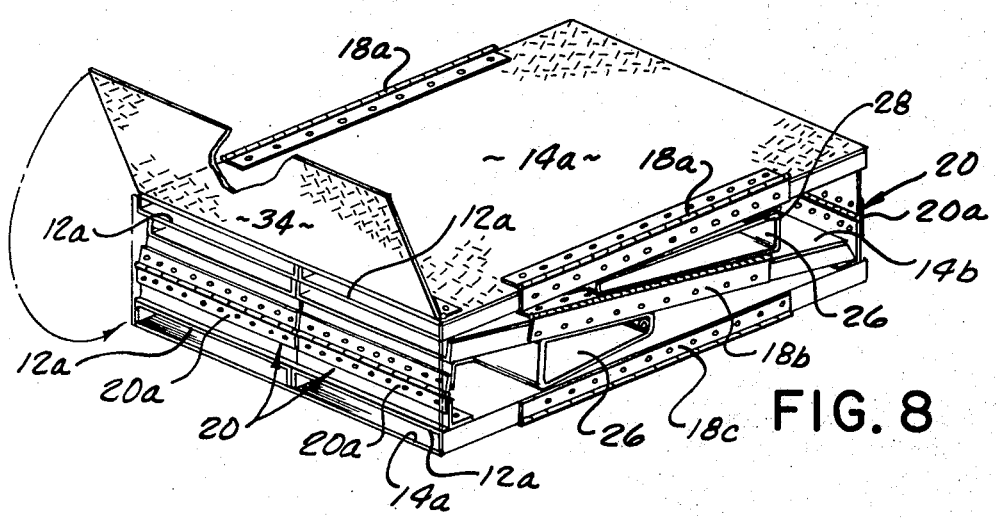
FIG. 8 is an enlarged perspective view of the ramp in its fully collapsed configuration.

The ramp is transformed from its partially folded configuration of FIG. 3 to its fully folded or collapsed configuration of FIG. 8 by folding the ends of the ramp inwardly over the center of the ramp, about the lateral hinging axes of the ramp, in the manner illustrated in FIG. 7. In this regard, it will be observed that the left-hand end of the ramp, that is, the left-hand ramp sections 12a, 14a are first folded inwardly over the center ramp sections 12b, 14b to the position illustrated in solid lines in FIG. 7. Thereafter, the right-hand end of the ramp, that is, the right-hand ramp sections 12a, 14a are folded inwardly over the previously folded lefthand end of the ramp to the position illustrated in broken lines in FIG. 7. It is to be noted that the ramp legs 24, 26 are so shaped and dimensioned that when the ramp is folded in the manner explained above, the legs are contained between the overlying ramp sections. In the finally folded or collapsed configuration of the ramp, therefore, the ramp sections 12a, 12b, 14a, 14b are disposed in face to face relation to provide a relatively small compact folded ramp package which may be conveniently stored and carried from one location to another. The hinged sub-ramps 32, 34 are folded against the ends of this package, as shown.

Turning now to FIGS. 9 through 13, there is illustrated the modified portable folding ramp 100 according to the invention. This modified ramp includes a pair of longitudinal ramp members 102, 104 disposed side by side and joined along their sides by longitudinal hinge means 106. Each ramp member has three separate sections arranged end to end. These ramp sections are designated by the same reference numeral as their respective ramp member and the subscripts a, b, and c, respectively. The ramp sections 102b, 102c and the ramp sections 104a, 104b are joined along their ends by lateral hinge means 108. The ends of the remaining ramp sections 102a, 102b and 104b, 104c are joined along their ends by releasable latch means 110. Rigidly joined to the undersides of the center ramp sections 102b, 104b are supporting legs 112, 114. It is significant to note that the lateral spacing between the legs 112 and the lateral spacing between the legs 114 of each ramp member 102, 104 is slightly greater than the lateral width of the corresponding outer ramp sections 102a, 102c, 104a, 104c, as the case may be.

The ramp sections 102a, 102b, 102c, and the ramp sections 104a, 104b, 104c are essentially mirror images of one another. Each of these ramp sections includes a laterally outer channel 116 and a laterally inner plate 118. In the normal configuration of use of the ramp 100, illustrated in FIG. 9, the channels 116 of the ramp sections 102a, 102b, 102c and the channels of the ramp sections 104a, 104b, 104c are longitudinally aligned to define tracks for receiving the wheels of a wheel chair. The inner plates 118 of the ramp sections define a walk-way for a person pushing the wheel chair along the ramp. The normally upper surfaces of the ramp channels 116 and ramp plates 118 are grooved, as illustrated in FIG. 10, to improve traction.

In the normal configuration of use of the modified ramp 100, illustrated in FIG. 9, the ramp members 102, 104 are disposed side by side and their respective ramp sections 102a, 102b, 102c and 104a, 104b, 104c are disposed end to end, substantially in a common plane to define a generally planar ramp configuration. In this use configuration of the ramp, the latter is supported on its legs 112, 114 and may have its upper end resting on a step, in the same manner as the upper end of the ramp in FIG. 1. In this configuration, a wheel chair may be propelled or pushed upwardly and downwardly along the ramp to permit the wheel chair to negotiate the steps or other obstruction on which the upper end of the ramp is mounted.

The modified ramp 100 is transformed to its folded or collapsed configuration of FIG. 11 by first releasing the latch means 110 and then laterally folding the ramp member 104 over the top of the ramp member 102, in the manner indicated in FIG. 10. This is the partially folded configuration of the ramp wherein said pair of longitudinally adjacent ramp sections are disposed in confronting face to face relation with a pair of longitudinally adjacent ramp sections of the laterally adjacent ramp member to form a set of confronting ramp sections. Only one pair of longitudinally adjacent ramp sections of each of these ramp sets is joined by lateral hinge means to permit endwise folding of the ramp to its fully folded configuration, as described below. The ramp is transformed from this partially folded configuration to its fully folded or compact configuration of FIG. 11 by folding the lefthand end of the ramp, that is, the ramp sections 102a, 104a, over the top of the center ramp sections 102b, 104b and folding the opposite end of the ramp, that is, the ramp sections 102c, 104c, against the underside of the center ramp sections, as illustrated in FIG. 11. It will be observed that when thus folded, the ends of the ramp are received between the ramp legs 112, 114. In the finally folded configuration of the ramp, therefore, the several ramp sections 102a, 102b, 102c, 104a, 104b, 104c are disposed in face to face relation to provide a relatively small compact ramp package, shown in FIG. 12, which may be easily stored and carried from one location to another.

What is claimed as new in support of Letters Patent is:

1. A portable ramp comprising:
   a number of longitudinal ramp members disposed side by side, each including a number of separate ramp sections disposed end to end,
   said ramp having a generally planar configuration of use wherein said ramp members are disposed side by side and said ramp sections of each ramp members are disposed end to end substantially in a common plane,
   longitudinal hinge means joining the laterally adjacent ramp sections along their sides for folding of said ramp sections laterally of said ramp to a partially folded ramp configuration wherein each pair of longitudinally adjacent ramp sections of each ramp member are disposed in confronting face to face relation with a pair of longitudinally adjacent ramp sections on the laterally adjacent ramp member to form a set of confronting ramp sections, and said ramp is foldable lengthwise about said lateral hinge means from said partially folded configuration to a relatively compact fully folded configuration, wherein longitudinally adjacent ramp sections of each ramp member are disposed in confronting face to face relation to facilitate storage and transportation of said ramp.

2. A ramp according to claim 1 wherein:
   said ramp comprises a center ramp member and two outer ramp members at opposite sides of said center ramp member, and said ramp is transformed from said configuration of use to said compact fully folded configuration by initial lateral folding of said outer ramp members toward one another about said longitudinal hinge means to positions wherein said outer ramp members are disposed in face to face relation with said center ramp member, and subsequent endwise folding of the ends of said ramp about said lateral hinge means to place the several sections of said ramp in face to face relation.

3. A portable ramp according to claim 2 wherein:
each ramp member has a center ramp section and two outer ramp sections, and said outer ramp sections are folded inwardly over and into face to face relation with said center ramp sections during final folding of said ramp from said partially folded configuration to said compact fully folded configuration.

4. A portable ramp according to claim 1 wherein:
said ramp comprises a pair of said ramp members disposed side by side, and said ramp is transformed from said configuration of use to said compact fully folded configuration by initial lateral folding of one ramp member about said longitudinal hinge means to a position on top of the other ramp member, and subsequent longitudinal folding of said ramp about said lateral hinge means to place the several ramp sections in face to face relation.

5. A portable ramp according to claim 4 wherein:
each ramp member has a central ramp section and two outer ramp sections, and said outer ramp sections are folded inwardly into face to face relation with said inner ramp sections.

6. A portable ramp according to claim 1 wherein:
said ramp is a wheel chair ramp having upwardly opening channels defining tracks for the wheels of a wheel chair and a walk-way between said tracks.

7. A portable wheel chair ramp comprising:
three longitudinal ramp members disposed side by side and each including three ramp sections disposed end to end,
longitudinal hinge means joining the adjacent ramp members along their sides,
lateral hinge means joining the adjacent ramp sections of the outer ramp members along their ends, said ramp having a generally planar normal configuration of use wherein said ramp members and sections are disposed substantially in a common plane, said ramp being foldable to a compact configuration for convenience of storage and transportation by initial lateral folding of the outer ramp members inwardly toward and into face to face relation with the center ramp member, and subsequent endwise folding of the outer ramp sections about said lateral hinge means inwardly toward and into face to face relation with the center ramp sections, and said outer ramp members comprising channels which define longitudinal tracks for receiving the wheels of a wheel chair when said ramp occupies said configuration of use.

8. A wheel chair ramp according to claim 7 including:
supporting legs hinged to the underside of said ramp so as to be foldable against said underside prior to folding of said ramp from said configuration of use to said compact configuration.

9. A portable wheel chair ramp comprising:
a pair of longitudinal ramp members disposed side by side and each including three ramp sections arranged end to end,
longitudinal hinge means joining said ramp members along their adjacent sides,
lateral hinge means joining two adjacent ramp sections only of one ramp member and the diagonally opposite adjacent pair of ramp sections only of the other ramp member along the ends of the adjacent sections,
said ramp having a normally generally planar configuration of use wherein said ramp members and sections are disposed substantially in a common plane, said ramp being foldable to a compact configuration by initial lateral folding of one ramp member about said longitudinal hinge means inwardly toward and into overlying face to face relation with the other ramp member and subsequent longitudinal folding of the outer ramp sections at one end of said ramp about the respective lateral hinge means inwardly toward and into overlying face to face relation with one side of the center ramp sections and longitudinal folding of the ramp sections at the opposite end of said ramp about the respective lateral hinge means inwardly toward and into overlying face to face relation with the opposite side of said center ramp sections.

10. A portable ramp according to claim 9 including:

releasable latch means joining the remaining adjacent ramp sections of each ramp member along their ends.

* * * * *